United States Patent
Seki et al.

(10) Patent No.: US 8,204,162 B2
(45) Date of Patent: Jun. 19, 2012

(54) RECEPTION FREQUENCY CONTROL CIRCUIT

(75) Inventors: Kazuhiko Seki, Tokyo (JP); Takashi Taya, Tokyo (JP)

(73) Assignee: Lapis Semiconductor Co., Ltd. (JP)

( * ) Notice: Subject to any disclaimer, the term of this patent is extended or adjusted under 35 U.S.C. 154(b) by 950 days.

(21) Appl. No.: 12/209,677

(22) Filed: Sep. 12, 2008

(65) Prior Publication Data

US 2009/0086856 A1   Apr. 2, 2009

(30) Foreign Application Priority Data

Sep. 27, 2007   (JP) .................................. 2007-251281

(51) Int. Cl.
*H04L 27/06* (2006.01)
(52) U.S. Cl. ..................................................... 375/344
(58) Field of Classification Search .................. 375/135, 375/261, 272, 295, 316, 317, 324, 327, 334, 375/340, 344, 346, 376; 455/68, 69, 86, 455/140, 227, 517
See application file for complete search history.

(56) References Cited

U.S. PATENT DOCUMENTS

| | | | | |
|---|---|---|---|---|
| 4,547,902 A | * | 10/1985 | Kasperkovitz | 455/194.2 |
| 4,980,687 A | * | 12/1990 | Newell et al. | 341/157 |
| 5,487,186 A | * | 1/1996 | Scarpa | 455/192.2 |
| 5,633,898 A | * | 5/1997 | Kishigami et al. | 375/344 |
| 6,038,268 A | * | 3/2000 | Kawai | 375/334 |
| 6,332,007 B1 | * | 12/2001 | Sasaki | 375/344 |
| 6,553,083 B1 | | 4/2003 | Kawai | |
| 2004/0017861 A1 | * | 1/2004 | Kobayashi et al. | 375/317 |
| 2006/0067435 A1 | * | 3/2006 | Ogawa et al. | 375/340 |

FOREIGN PATENT DOCUMENTS

| | | |
|---|---|---|
| JP | 10257110 | 9/1998 |
| JP | 11313117 | 11/1999 |

* cited by examiner

*Primary Examiner* — David C. Payne
*Assistant Examiner* — Syed Haider
(74) *Attorney, Agent, or Firm* — Studebaker & Brackett PC; Donald R. Studebaker

(57) ABSTRACT

The present invention aims to provide a reception frequency control circuit that is small in mounting area and unaffected by disturbance where an FSK-modulated signal is demodulated. In the reception frequency control circuit, a reception signal processing unit converts an FSK-modulated digital signal to an intermediate frequency when the FSK-modulated digital signal is received. Thereafter, a frequency voltage converting unit converts the intermediate signal to a voltage signal and outputs an output signal. At the same time, an analog frequency controlling unit detects a frequency deviation from the output signal by analog processing. A digital frequency controlling unit generates a reception frequency control signal for correcting the frequency and feeds back the same to the reception signal processing unit. Stable frequency control can be realized by performing reception frequency control by a combination of an analog circuit-digital circuit in this way.

3 Claims, 5 Drawing Sheets

EXAMPLE OF FREQUENCY CONVERSION

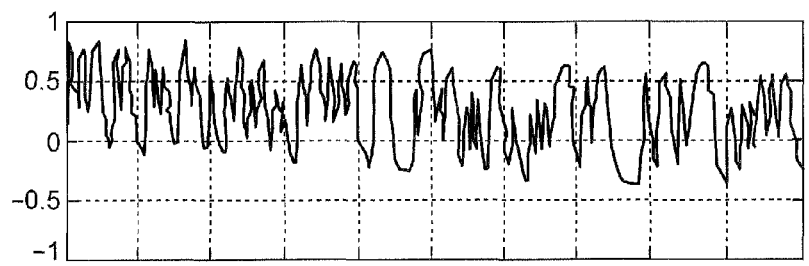
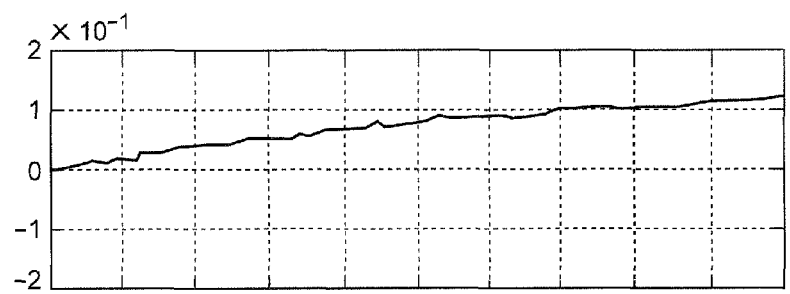
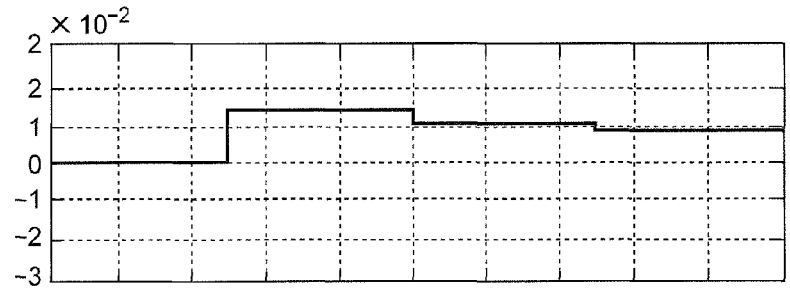
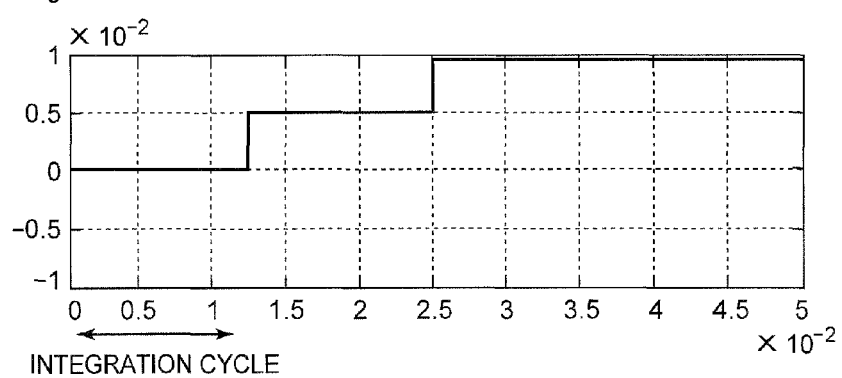
EXAMPLE OF AFC OPERATION

ANOTHER EXAMPLE OF FREQUENCY CONVERSION

RECEPTION FREQUENCY CONTROL CIRCUIT

BACKGROUND OF THE INVENTION

The present invention relates to a receiver which demodulates an FSK (Frequency Shift Keying) modulated signal, and particularly to a circuit which controls a reception signal.

An FSK modulation system is a sort of frequency modulation system and is of a system that communicates a digital signal through an analog transmission line. This has widely been adopted for a portable receiver or receiving device such as a pager, beeper or the like because the digital signal can be transmitted/received in a relatively simple configuration.

Since, however, reception performance is degraded significantly when the frequency being present in transmission deviates, the receiving side needs to perform a correction for controlling a receive or reception frequency and allowing it to approach a transmit or transmission frequency.

A frequency control circuit for detecting a deviation of a phase plane to correct the frequency has been disclosed in each of patent documents 1 (Japanese Unexamined Patent Publication No. Hei 11(1999)-313117) and 2 (Japanese Patent No. 3178268). A frequency control circuit for correcting the frequency according to the amplitude of a frequency-voltage conversion signal has been disclosed in a patent document 3 (Japanese Patent No. 3070733). Further, a frequency control circuit for correcting the frequency by feedback processing of a digital signal has been disclosed in a patent document 4 (Japanese Unexamined Patent Publication No. Hei 10(1998)-257110).

When a deviation in phase plane is detected to correct the frequency in each of these conventional frequency control circuits, there is a need to decompose a receive or reception signal into orthogonal components in order to carry out it by digital signal processing and provide correction circuits on a component-by-component basis. That is, a problem arises in that since the same circuits of two systems are required, the mounting area of each circuit cannot be reduced.

A problem also arises in that since an AFC (Automatic Frequency Control) circuit comprised of an analog circuit exists where the amplitude of the frequency voltage conversion signal is used, there is a possibility that parameters of circuit elements will vary due to temperatures, variations with time and the like, thus causing an unexpected operation.

SUMMARY OF THE INVENTION

The present invention has been made to solve the drawbacks of such related arts. It is an object of the present invention to provide a reception frequency control circuit and an FSK receiver, each of which is capable of performing a frequency correction stably with respect to external factors such as temperatures and variations with time and reducing a circuit mounting area.

According to one aspect of the present invention, for attaining the above object, there is provided a reception frequency control circuit which receives and demodulates an FSK-modulated digital signal, comprising a reception signal processing unit for converting the received digital signal into an intermediate frequency, based on a pre-given frequency set signal, thereafter eliminating an unnecessary signal therefrom and supplying a constant amplitude intermediate frequency signal whose voltage amplitude is set constant to a frequency voltage converting unit; the frequency voltage converting unit for converting the constant amplitude intermediate frequency signal to a baseband signal having voltage amplitude by frequency-voltage conversion, setting the same as an output signal and supplying the output signal to an analog frequency controlling unit to correct a frequency deviation component; the analog frequency controlling unit for extracting the frequency deviation component contained in the output signal in analog form and supplying the same to a digital frequency controlling unit as a pulse signal; and the digital frequency controlling unit for bringing the pulse signal into digital form thereby to eliminate a noise component, further averaging the so-processed signal, thereafter converting the signal to a fundamental frequency set value, correcting the fundamental frequency set value and feeding back the same to the reception signal processing unit.

According to the reception frequency control circuit of the present invention, it needs not to have the same circuits of two systems. A frequency deviation can be detected regardless of the proportion of 0 and 1 signals contained in an information signal. Further, an analog signal is converted to a digital signal to control the frequency. Therefore, since the frequency control can be realized regardless of a change in parameter in an analog circuit, a stable frequency control circuit is implemented in a smaller mounting area.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 3 is a graph showing the transition of signal waveforms in the embodiment shown in FIG. 1;

DETAILED DESCRIPTION OF THE PREFERRED EMBODIMENTS

Preferred embodiments of the present invention will hereinafter be described with reference to the accompanying drawings.

Figure 1:
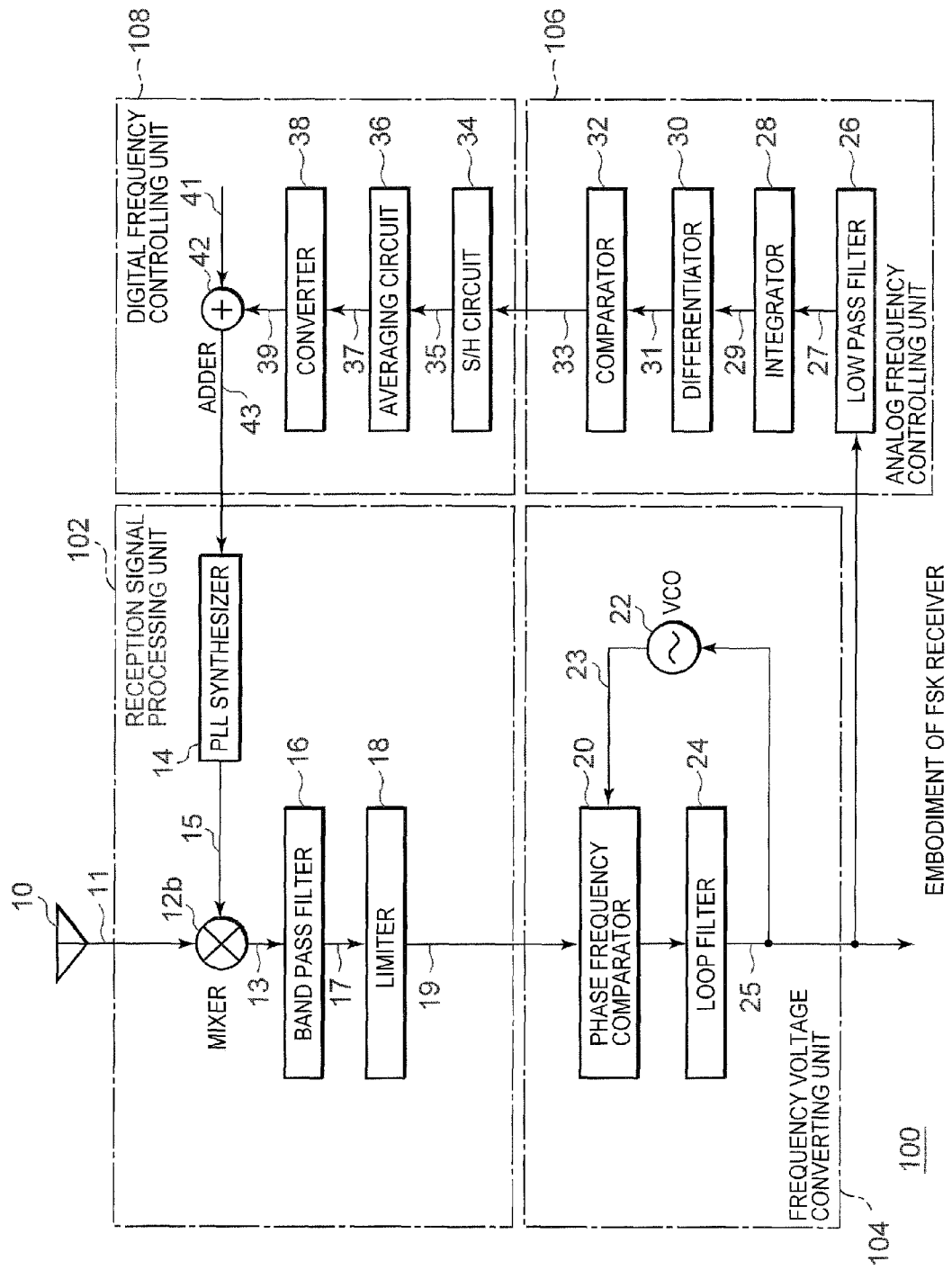
FIG. 1 is a diagram showing a configuration of a reception frequency control circuit according to an embodiment of the present invention.

One embodiment of an FSK receiver according to the present invention will next be explained in detail with reference to the accompanying drawings. The FSK receiver 100 shown in FIG. 1 illustrates an embodiment of an FSK receiver that performs FSK demodulation in a single conversion system. The FSK receiver 100 has the function of receiving an FSK-modulated digital signal, correcting a deviation in its frequency and demodulating the same. Incidentally, portions having no direct bearing on the understanding of the present invention are not shown and redundant explanations will be avoided.

In the present embodiment, the FSK receiver 100 includes a reception signal processing unit 102, a frequency voltage converting unit 104, an analog frequency controlling unit 106 and a digital frequency controlling unit 108 as a whole.

The reception signal processing unit 102 has the function of converting the received FSK-modulated digital signal 11 into an intermediate frequency 13, based on a frequency set signal 15 given in advance and thereafter eliminating an unnecessary signal, and supplying a constant amplitude intermediate frequency signal 19 whose voltage amplitude is kept constant to the frequency voltage converting unit 104. The reception signal processing unit 102 includes a mixer or mixer circuit 12, a PLL (Phase Locked Loop) synthesizer 14, a band pass filter (BPF) 16 and a limiter (LIM) 18.

The frequency voltage converting unit 104 has the function of performing frequency-voltage conversion on the constant amplitude intermediate frequency signal 19 supplied from the reception signal processing unit 102 to convert into a baseband signal having voltage amplitude, setting the same as an output signal 25 of the present device 100 and supplying the output signal 25 to the analog frequency controlling unit 106 for the correction of a frequency deviation component thereof. The frequency voltage converting unit 104 includes a phase frequency comparator 20, a loop filter 24 and a voltage control oscillator (VCO) 22 and forms a so-called phase locked loop.

The analog frequency controlling unit 106 has the function of extracting the frequency deviation component contained in the output signal 25 supplied from the frequency voltage converting unit 104 using an analog circuit and supplying the same to the digital frequency controlling unit 108 as a pulse signal 33. The analog frequency controlling unit 106 includes a low pass filter 26, an integrator 28, a differentiator 30 and a comparator 32.

The digital frequency controlling unit 108 brings the pulse signal 33 supplied from the analog frequency controlling unit 106 into digital form to eliminate nose components, averaging the same, followed by being converted to a basic or fundamental frequency set value 41, correcting the frequency set value 41 and feeding back the corrected signal to the reception signal processing unit. The digital frequency controlling unit 108 includes an S/H (Sample and Hold) circuit 34, an averaging circuit 36, a converter 38 and an adder 42.

The mixer 12 of the reception signal processing unit 102 employed in the present embodiment mixes a reception signal received by an antenna 10 and the frequency set signal 15 supplied from the PLL synthesizer 14 to convert into an intermediate frequency 13.

The PLL synthesizer 14 generates a frequency set signal 15, based on setting frequency data 43 supplied from the adder 42 and supplies the same to the mixer 12.

The band pass filter 16 eliminates an unnecessary signal fetched into the mixer 12 from the intermediate frequency 13 supplied from the mixer 12 and transmits the same to the limiter 18 as an intermediate frequency signal 17.

The limiter 18 holds constant the amplitude of the intermediate frequency signal 17 transmitted from the band pass filter 16 and supplies the same signal to the phase frequency comparator 20 of the frequency voltage converting unit 104 as a constant amplitude intermediate frequency signal 19.

The phase frequency comparator 20 of the frequency voltage converting unit 104 compares the constant amplitude intermediate frequency signal 19 transmitted from the limiter 18 and an adjustment intermediate frequency 23 generated by the voltage control oscillator 22, generates a comparison signal 21 as a voltage and supplies the same to the loop filter 24.

The voltage control oscillator 22 generates an adjustment intermediate frequency 23 adjusted according to the output signal 25 supplied from the loop filter 24 and feeds back the same to the phase frequency comparator 20.

The loop filter 24 eliminates a high frequency component contained in the comparison signal 21 outputted from the phase frequency comparator 20 and sets the so-processed signal as the output signal 25 of the present device. The loop filter 24 supplies the output signal 25 to the voltage control oscillator 22 as a control voltage to stabilize the frequency and supplies the output signal 25 to the low pass filter 26 of the analog frequency controlling unit 106 to control a deviation in reception frequency.

The low pass filter 26 of the analog frequency controlling unit 106 allows an information signal and a frequency deviation component of a transmission/reception frequency, of the output signal 25 supplied from the loop filter 24 to pass therethrough and supplies the same to the integrator 28.

The integrator 28 integrates a signal 27 indicative of the information signal and the frequency deviation component of the transmission/reception frequency, which is supplied from the low pass filter 26, every constant integration section or interval thereby to perform its smoothing to eliminate an information modulation signal and thereafter transmits it to the differentiator 30 as an integration signal 29.

The differentiator 30 differentiates the integration signal 29 transmitted from the integrator 28 thereby to extract a frequency deviation component based on a deviation of the accumulated probability of occurrence of 0 and 1 and supplies the same to the comparator 32.

The comparator 32 makes a decision by comparison between the frequency deviation component 31 supplied from the differentiator 30 and each voltage lying in a predetermined set range, outputs a positive or negative pulse signal 33 and supplies the same to the S/H circuit 34.

The S/H circuit 34 of the digital frequency controlling unit 108 samples the pulse signal 33 supplied from the comparator 32 in the same cycle as the integration section of the integrator 28 thereby to convert into a digital signal 35 and supplies the same to the averaging circuit 36.

The averaging circuit 36 averages the digital signal 35 supplied from the S/H circuit 34 to estimate the value of a reception frequency deviation and transmits an averaged signal 37 to the converter 38.

The converter 38 converts the averaged signal 37 supplied from the averaging circuit 36 into the frequency and sends the same to the adder 42 as a deviation frequency 39 for frequency setting of the PLL synthesizer 14.

The adder 42 performs addition/subtraction on the deviation frequency 39 transmitted from the converter 38 and the fundamental frequency set value 41 and supplies the result of addition/subtraction to the PLL synthesizer 14.

The operation from the reception of the FSK receiver 10 according to the present embodiment to its output will next be explained with reference to the accompanying drawings.

In the present embodiment, when an FSK-modulated digital signal 11 (hereinafter called "reception frequency") is received at the antenna 10, it is transmitted to the mixer 12.

Figure 2A:
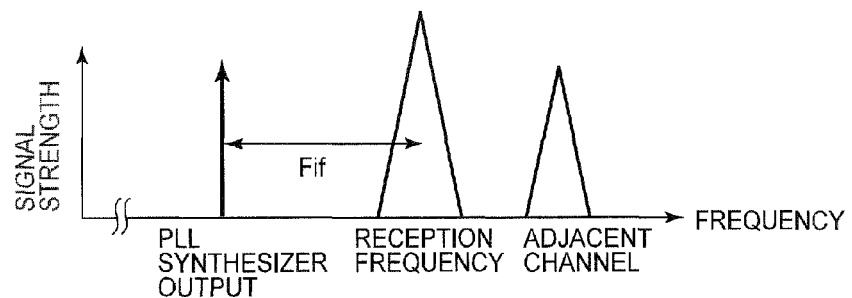
FIG. 2 is a graph illustrating a frequency conversion transition in the embodiment shown in FIG. 1.

A frequency set signal 15 based on previously-given frequency set data outputted from the PLL synthesizer 14 is outputted and transmitted to the mixer 12. As shown in FIG. 2(a), the frequency set signal 15 is of a frequency separated from the frequency of the reception frequency 11 by an intermediate frequency Fif. FIG. 2(a) shows a case in which the same frequency is of a frequency lower than the reception frequency 11. However, the frequency may be a frequency higher than the reception frequency.

Figure 2B:
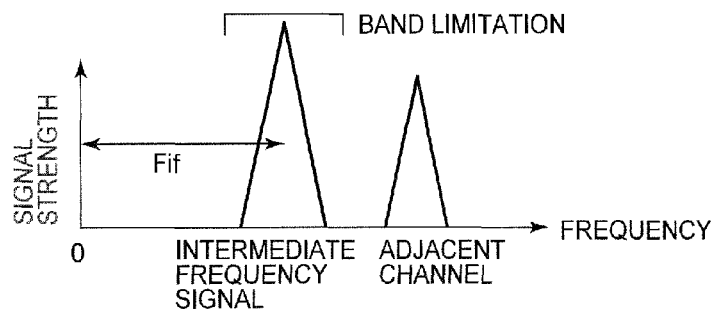

The mixer 12 mixes the reception frequency 11 and the frequency set signal to convert into such an intermediate frequency 13 as shown in FIG. 2(b) and transmits the same to the band pass filter 16.

Figure 2C:
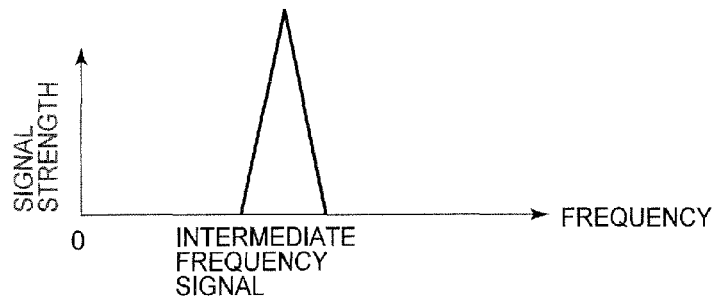

Since the Intermediate frequency transmitted from the mixer 12 contains an unnecessary signal such as an adjacent channel signal as shown in FIG. 2(*b*), the unnecessary signal is eliminated at the band pass filter 16, and an intermediate frequency signal 17 corresponding to the required reception signal alone is detected as shown in FIG. 2(*c*).

The intermediate frequency signal 17 obtained here fluctuates in voltage amplitude due to disturbances such as variations in reception strength at reception. In order to provide its stable operation by the frequency voltage converting unit 104 of the next step, the intermediate frequency signal 17 is transmitted to the limiter 18, where its voltage amplitude is set constant, after which the so-processed signal is supplied to the phase frequency comparator 20 as a constant amplitude intermediate frequency signal 19.

The frequency voltage converting unit 104 of the next step functions as a phase locked loop formed of the phase frequency comparator 20, loop filter 24 and VCO 22. The phase frequency comparator 20 frequency-voltage converts the constant amplitude intermediate frequency signal 19 transmitted from the limiter 18 to convert into a baseband signal having voltage amplitude proportional to its frequency, which in turn becomes an output signal 25 of the present device.

The operation of detecting a reception frequency deviation from the output signal 25 obtained here and controlling the reception frequency will next be explained.

Since the output signal 25 becomes wide in frequency band, it is transmitted to the low pass filter 26 from which only an information signal and a frequency deviation component of a transmission/reception frequency such as shown in FIG. 3(*a*) are detected.

Next, they are sent to the integrator 28, where they are smoothed to eliminate the information signal, so that such a cumulative signal of frequency deviation components as shown in FIG. 3(*b*) is obtained. This is based on the premise that the information signal at its reception is of a digital signal in which a distinction between logical values 1 and 0 is made based on the frequency, and the rates of occurrence of 1 and 0 are approximately equal. Sine the rate of occurrence of 1 or 0 deviates actually, the accumulation of non-canceled deviation components is utilized.

An integration signal 29 transmitted from the integrator 28 is differentiated by the differentiator 30, from which a change in integral output equivalent to a frequency deviation which deviates or is shifted in a given direction as shown in FIG. 3(*c*) is extracted as a differential signal 31.

Further, the differential signal 31 is sent to the comparator 32 in such a manner that a no-se variation contained in the integration signal 29 is not detected. Such a value that the variation based on noise is not detected is set in advance by the comparator 32. Only when the differential signal exceeds the value, a pulse signal 33 having three values corresponding to a positive value, a negative value and 0 is outputted as the result of determination.

The result of determination is transmitted to the S/H circuit 34 as the pulse signal 33, where it is sampled at intervals each equal to an integral time at the integrator 28, followed by being converted into a digital signal 35 from which noise has been eliminated.

Next, the digital signal 35 is averaged at the averaging circuit 36, so that each estimated reception frequency deviation signal 37 is transmitted to the converter 38.

Such signals as referred to above are converted to frequency setting data of the PLL synthesizer 14 at the converter 38. The adder 42 corrects an initial fundamental frequency set value 41, based on the frequency setting data.

By feeding back a reception frequency control signal 43 obtained by this correction to the mixer 12, the whole reception frequency control circuit can be controlled stably. At this time, its stability can further be ensured by correcting a change of frequency such that it is reduced.

Figure 4:
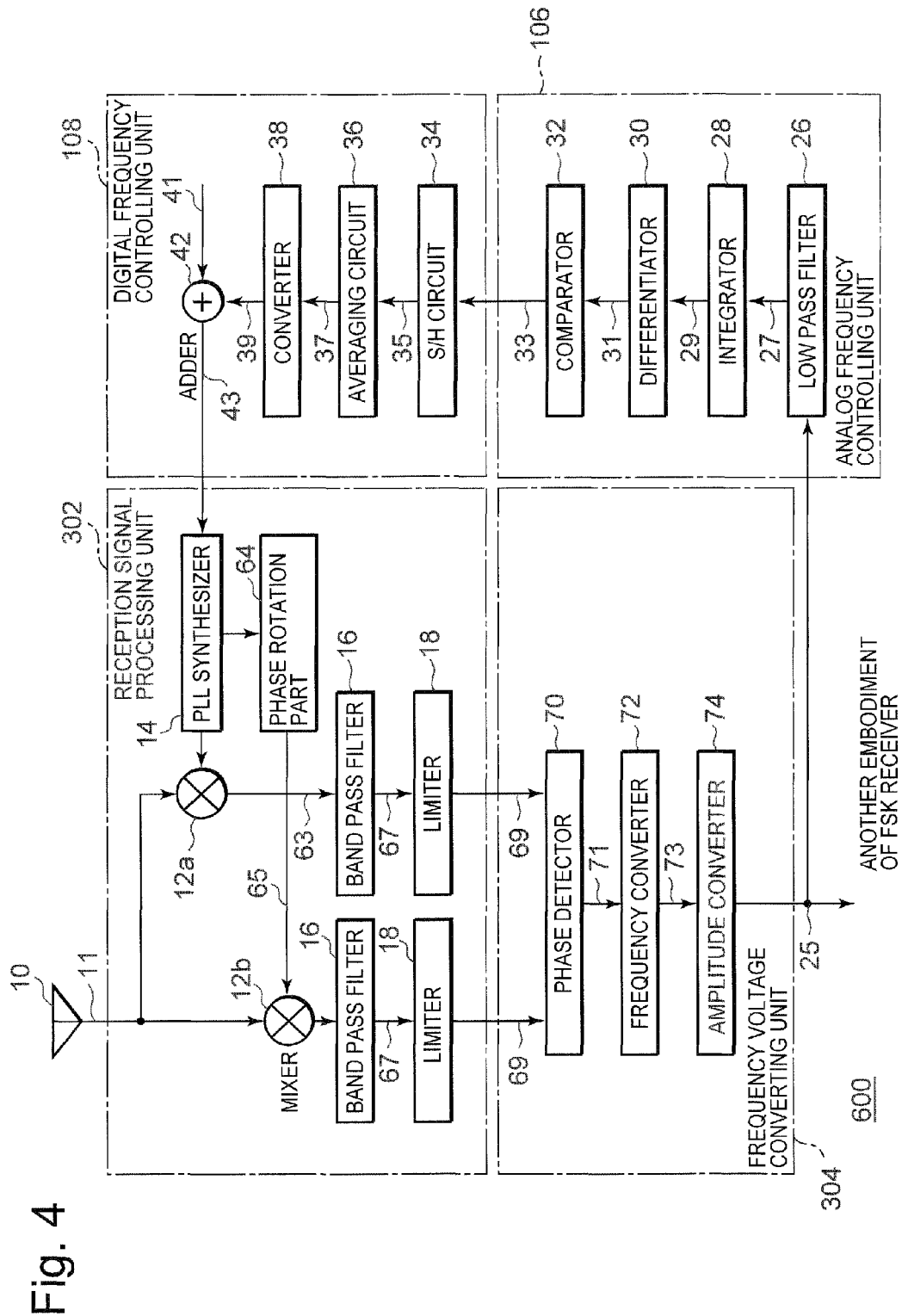
FIG. 4 is a diagram illustrating a configuration of a reception frequency control circuit according to another embodiment of the present invention.

A configuration of an FSK receiver 600 according to another embodiment will next explained with reference to FIG. 4. However, the same reference numerals are attached to elements similar to those shown in FIG. 1.

The present embodiment is of one that performs FSK demodulation in a direct conversion system. The FSK receiver 600 includes a reception signal processing unit 302, a frequency voltage converting unit 304, an analog frequency controlling unit 106 and a digital frequency controlling unit 108 and processes a reception signal corresponding to a digital signal through the reception signal processing unit 302. Here, since the analog frequency controlling unit 106 and the digital frequency controlling unit 108 are identical to those of the previous embodiment in configuration and function, their explanations will be omitted.

The reception signal processing unit 302 has the function of mixing a reception frequency equivalent to an RF frequency of a receive or reception signal, which is generated by a PLL synthesizer 14 and a reception frequency whose phase is rotated by π/2 radians (90°) thereby to convert a received and FSK-modulated digital signal 11 to a baseband receive or reception signal approximately zero in frequency component, eliminating an unnecessary signal therefrom to hold its voltage amplitude constant, and thereafter supplying the signal to a phase detector 70. The reception signal processing unit 302 includes two mixer circuits or mixers 12, band pass filters 6 and limiters 18, one PLL synthesizer 14 and a phase rotation part 64.

The frequency voltage converting unit 304 has the function of converting two constant amplitude signals 69 different in phase supplied from the reception signal processing unit 302 to phase information as a digital signal, converting the same to frequency information, converting the frequency information to amplitude information, i.e., a voltage signal 25 and outputting the voltage signal, and supplying the voltage signal 25 to a low pass filter 26 of the analog frequency controlling unit 106 to perform reception frequency deviation control. The frequency voltage converting unit 304 includes a phase detector 70, a frequency converter 72 and an amplitude converter 74.

One mixer 12 of the reception signal processing unit 302 mixes the signal 11 received at an antenna and a reception frequency set signal 15 of a frequency equivalent to the reception signal supplied from the PLL synthesizer 14. The other mixer 12 mixes the signal 11 received by the antenna and a phase rotation signal 65 obtained by rotating the reception frequency set signal of the frequency equivalent to the reception signal supplied from the PLL synthesizer 14 by π/2 radians (90°) using the phase rotation part 64. They convert both signals into baseband signals 63 approximately zero in frequency component respectively, which in turn are supplied to their corresponding band pass filters 16.

The band pass filters 16 respectively eliminate unnecessary signals taken in intermediate frequency signals at the mixers 12 and respectively transmit the so-processed reception signals 67 to the limiters 18.

The limiters 18 respectively convert the amplitudes of the reception signals 67 sent from the band pass filters 16 into constant amplitude signals 69 and supply the same to the phase detector 70 of the frequency voltage converting unit 304.

The phase detector 70 of the frequency voltage converting unit 304 converts the two constant amplitude signals 69 different in phase transmitted from the limiters 18 to phase information 71 as a digital signal and sends the same to the frequency converter 72.

The frequency converter 72 converts the phase information 71 supplied from the phase detector 70 to frequency information 73 and supplies the same to the amplitude converter 74.

The amplitude converter 74 converts the frequency information 73 supplied from the frequency converter 72 to amplitude information, i.e., a voltage signal and sets the same as an output signal 25. In order to perform reception frequency deviation control, the output signal 25 is supplied to the low pass filter 26 of the analog frequency controlling unit 106.

Subsequently, this voltage signal is fed back to each mixer as a reception frequency generating signal in the same configuration as one of the previous embodiment.

The operation from the reception of the FSK receiver 600 according to the present embodiment to its output will next be explained with reference to FIG. 5.

In the present embodiment, when an FSK-modulated digital signal 11 is received by the antenna 10, it is transmitted to the two mixers 12 respectively.

Figure 5A:
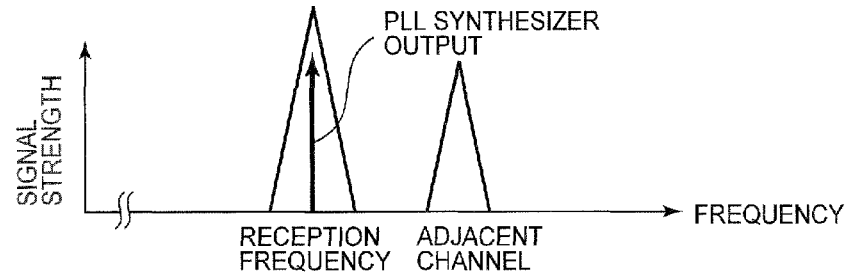
FIG. 5 is a graph showing a frequency conversion transition in the embodiment shown in FIG. 4.

As shown in FIG. 5(a), a frequency set signal 15 equivalent to an RF frequency of the reception signal is generated by the PLL synthesizer 14 and sent to the mixer 12a and the phase rotation part 64.

The frequency set signal 15 outputted from the PLL synthesizer 14 to the phase rotation part 64 is 90° phase-shifted by the phase rotation part 64 and set to the mixer 12b as a phase frequency set signal 65.

Figure 5B:
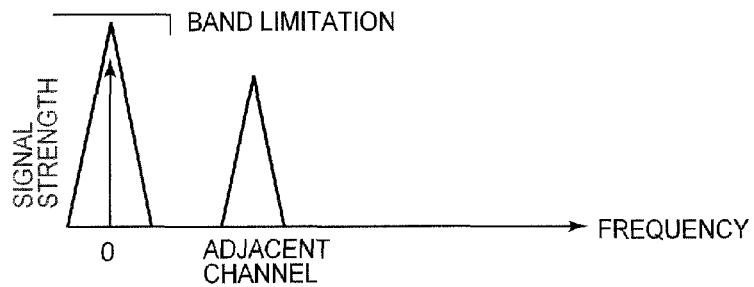
Figure 5C:
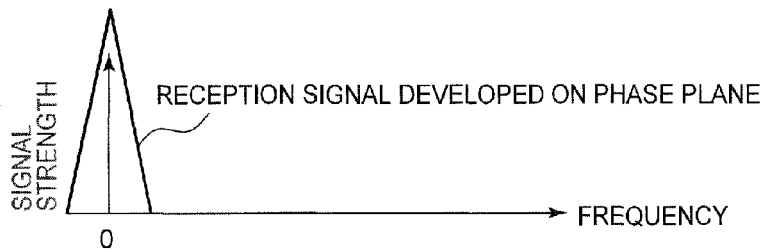

The mixer 12a to which the frequency set signal 15 is sent, mixes the reception frequency 11 and the frequency set signal 15 to convert into a baseband reception signal approximately zero in frequency component as shown in FIG. 5(b).

The phase frequency set signal 65 transmitted from the phase rotation part 64 to the mixer 12b is similarly converted to a phase-variation baseband reception signal approximately zero in frequency component and orthogonal onto a phase plane.

It is thus possible to decompose and convert the signal into orthogonal components of an I ch (In phase channel) and a Q ch (Quadra phase channel).

The baseband reception signals 63 sent from the mixers respectively are transmitted to their corresponding band pass filters 16, where unnecessary signals such as adjacent channel signals are eliminated therefrom, so that receive or reception signals 67 are detected.

Further, since amplitude variation components are unnecessary because of the FSK modulation system, they are sent to their corresponding limiters 18 where they are converted to constant amplitude signals 69. Thus, the constant amplitude signals can be processed as Ich and Qch signals each having phase information only with constant amplitude.

These constant amplitude signals 69 are transmitted to the phase detector 70 of the frequency voltage converting unit 304, where they are converted to phase information by digital processing.

Then, the frequency converter 72 performs conversion into frequency information 73, based on the phase information 71 obtained at the phase detector 70.

Further, the frequency information 73 is converted to voltage amplitude information 75 by the amplitude converter 74 to make signal processing at a subsequent step easy, and the so-converted voltage amplitude information 75 becomes an output signal 25 of the present device. This is identical to the output signal 25 of the previous embodiment, and frequency control can be performed in exactly the same operation.

As described above, the present invention can be applied to all systems in each of which an FSK-modulated signal is frequency-voltage converted and demodulated.

While the preferred forms of the present invention have been described, it is to be understood that modifications will be apparent to those skilled in the art without departing from the spirit of the invention. The scope of the invention is to be determined solely by the following claims.

Drawings

FIG. 1

Embodiment of FSK Receiver

102 . . . RECEPTION SIGNAL PROCESSING UNIT
  12 . . . MIXER, 14 . . . PLL SYNTHESIZER, 16 . . . BAND PASS FILTER, 18 . . . LIMITER
104 . . . FREQUENCY VOLTAGE CONVERTING UNIT
  20 . . . PHASE FREQUENCY COMPARATOR, 24 . . . LOOP FILTER
106 . . . ANALOG FREQUENCY CONTROLLING UNIT
  26 . . . LOW PASS FILTER, 28 . . . INTEGRATOR, 30 . . . DIFFERENTIATOR, 32 . . . COMPARATOR
108 . . . DIGITAL FREQUENCY CONTROLLING UNIT
  34 . . . S/H CIRCUIT, 36 . . . AVERAGING CIRCUIT, 38 . . . CONVERTER, 42 . . . ADDER

FIG. 2

Example of Frequency Conversion
(a) Signal Strength
  PLL SYNTHESIZER OUTPUT, RECEPTION FREQUENCY, ADJACENT CHANNEL FREQUENCY
(b) Band Limitation
Signal Strength
  INTERMEDIATE FREQUENCY SIGNAL, ADJACENT CHANNEL FREQUENCY
(c) Signal Strength
  INTERMEDIATE FREQUENCY SIGNAL FREQUENCY

FIG. 3

Example of AFC Operation
Integration Cycle

FIG. 4

Another Embodiment of the FSK Receiver
302 . . . RECEPTION SIGNAL PROCESSING UNIT
  12b . . . MIXER, 14 . . . PLL SYNTHESIZER, 16 . . . BAND PASS FILTER, 16 . . . BAND PASS FILTER, 18 . . . LIMITER, 18 . . . LIMITER, 64 . . . PHASE ROTATION PART
304 . . . FREQUENCY VOLTAGE CONVERTING UNIT
  70 . . . PHASE DETECTOR, 72 . . . FREQUENCY CONVERTER, 74 . . . AMPLITUDE CONVERTER
106 . . . ANALOG FREQUENCY CONTROLLING UNIT
  26 . . . LOW PASS FILTER, 28 . . . INTEGRATOR, 30 . . . DIFFERENTIATOR, 32 . . . COMPARATOR
108 . . . DIGITAL FREQUENCY CONTROLLING UNIT
  34 . . . S/H CIRCUIT, 36 . . . AVERAGING CIRCUIT, 38 . . . CONVERTER, 42 . . . ADDER

FIG. 5

Another Example of Frequency Conversion
(a) Signal Strength
  PLL SYNTHESIZER OUTPUT, RECEPTION FREQUENCY, ADJACENT CHANNEL, FREQUENCY
(b) Band Limitation
Signal Strength
  ADJACENT CHANNEL FREQUENCY
(c) Signal Strength
  RECEPTION SIGNAL DEVELOPED ON PHASE PLANE FREQUENCY

What is claimed is:

1. A receiver having a reception frequency control circuit, wherein the receiver receives and demodulates a frequency shift keying modulated digital signal, comprising:

a reception signal processing unit to convert the received digital signal to an intermediate frequency, based on a pre-given frequency set signal, to eliminate an unnecessary signal therefrom and to supply a constant amplitude intermediate frequency signal, whose voltage amplitude is set constant, to a frequency voltage converting unit;

said frequency voltage converting unit is to convert the constant amplitude intermediate frequency signal to a baseband signal having voltage amplitude by frequency-voltage conversion, and to set the same as an output signal and to supply the output signal to an analog frequency controlling unit to correct a frequency deviation component;

said analog frequency controlling unit is to extract the frequency deviation component contained in the output signal in analog form and to supply the same to a digital frequency controlling unit as a pulse signal; and said digital frequency controlling unit is to change the pulse signal into digital form thereby to eliminate a noise component, and to average the digitized signal, to convert the signal to a fundamental frequency set value, to correct the fundamental frequency set value and and to feed back the same to the reception signal processing unit.

2. The reception frequency control circuit according to claim 1, wherein the analog frequency controlling unit includes:

a filter to eliminate a high frequency component of a comparison signal supplied from the frequency voltage converting unit, a modulated signal integrator to integrate the comparison signal every predetermined section and providing a modulated signal to an averaged integration signal, an integration signal differentiator to differentiate the integration signal thereby to extract a frequency deviation component, and a digital signaling unit to convert the frequency deviation component to a deviation component digital signal comprised of three values, using a predetermined threshold value, and wherein the digital frequency controlling unit includes:

a digital signal averaging unit to average the deviation component digital signal to produce a deviation component averaged signal, a deviation frequency converter to frequency-convert the deviation component averaged signal into a deviation frequency signal, an adder to add the fundamental frequency set value to the deviation frequency signal to produce an addition signal, and a feedback circuit to feed back the addition signal to the reception signal processing unit.

3. The reception frequency control circuit according to claim 1, wherein the reception signal processing unit includes:

digital signal receiving unit to receive a frequency shift keying modulated digital signal, an intermediate frequency converting unit to mix the digital signal with a pre-set reception frequency setting signal to convert into an intermediate frequency signal, and amplitude limiter to maintain the amplitude of the intermediate frequency signal constant, and wherein the frequency voltage converting unit includes frequency voltage converting unit the intermediate frequency signal constant in amplitude to a voltage signal.

* * * * *